United States Patent [19]
Schiefer

[11] 4,289,062
[45] Sep. 15, 1981

[54] EXPANSION DOWEL

[75] Inventor: Erwin Schiefer, Munich, Fed. Rep. of Germany

[73] Assignee: Hilti Aktiengesellschaft, Schaan, Liechtenstein

[21] Appl. No.: 34,147

[22] Filed: Apr. 27, 1979

[30] Foreign Application Priority Data

May 5, 1978 [DE] Fed. Rep. of Germany ....... 2819862

[51] Int. Cl.³ .............................................. F16B 13/04
[52] U.S. Cl. ....................................... 411/34; 411/15; 411/61; 411/340; 411/908
[58] Field of Search ........................ 85/70, 71, 73–78, 85/82–84, 80, 3 R, 3 S; 24/73 A, 73 P, 73 D, 73 PF, 73 SM

[56] References Cited
U.S. PATENT DOCUMENTS

| | | | |
|---|---|---|---|
| 3,651,734 | 3/1972 | McSherry | 85/80 |
| 4,022,100 | 5/1977 | Johnson | 85/83 |
| 4,152,968 | 5/1979 | Lassine | 85/71 |
| 4,181,061 | 1/1980 | McSherry | 85/83 X |
| 4,197,781 | 4/1980 | Giannuzzi | 85/82 X |

Primary Examiner—William E. Lyddane
Attorney, Agent, or Firm—Toren, McGeady and Stanger

[57] ABSTRACT

An expansion dowel for insertion through an opening in a structural member into a hollow space within the structural member, is formed of a shaft portion, a pair of expansion arms connected to the shaft portion and a pair of webs, each joined to one of the expansion arms and connected to one another. In the inserting position, the expansion arms and webs are folded inwardly and extend along the projection of the axis of the shaft portion. When the dowel is displaced into the expansion position, the expansion arms extend approximately perpendicularly to the axis of the shaft portion and each web is disposed at an acute angle to the expansion arm to which it is joined.

6 Claims, 3 Drawing Figures

EXPANSION DOWEL

SUMMARY OF THE INVENTION

The present invention is directed to an expansion dowel for use in plates, walls, hollow blocks and other structural members which have hollow spaces inwardly of the opening through which the expansion dowel is inserted, so that the dowel extends into the hollow space. The dowel has a leading end, which is inserted first into an opening, and a trailing end. The dowel includes an axially extending shaft portion extending from the trailing end with a flange portion at the trailing end. A pair of flexible expansion arms are connected to the end of the shaft portion spaced from the trailing end and a pair of elongated webs are arranged with each being connected at one end to one of the extension arms, and at the other end to the other web. The connection of the webs to the expansion arms and to one another are flexible.

Dowels of the above type are particularly directed to use in structural members which have a hollow space inwardly of the surface through which the dowel is inserted so that the dowel extends into the hollow space. A variety of such structural members are known, for example, plates, walls, hollow blocks and the like. Initially, such a dowel is inserted through an opening in the surface of the structural member and extends into the hollow space so that upon expansion the arms extend outwardly transversely of the direction from the leading end to the trailing end of the dowel. Various special measures are utilized for effecting the expansion of the dowel. When the dowel is deformed into the expansion position, the expansion arms move into contact with an interior surface of the structural member within the hollow space and provide an abutment for affording a holding action for the dowel on the structural member.

A majority of the dowels of this type are formed of a plastics material and include a pair of expansion arms connected at their free ends through joints to webs. The webs are flexibly connected to one another. In the inserting position, the dowels are placed into an opening in the surface of a structural member and the expansion arms are folded inwardly extending in the axial direction of the dowel. Similarly, the webs are folded along with the expansion arms so that the arms and webs extend essentially parallel to one another. In the inserting position, the junction of the two webs is spaced from the leading ends of the expansion rods which are first inserted into the opening in the structural member. After the dowel is inserted into the opening, an expansion screw is placed into the dowel and effects the spreading of the expansion arms. Instead of an expansion screw, another implement can be used to effect the expanding operation. During the expansion operation, the junction of the webs is shifted forwardly while the location of the joints between the webs and the expansion arms move outwardly apart from one another. After a neutral mid-position is exceeded, in which the expansion arms form an angle of 180°, an automatic locking effect is achieved. In this position, the expansion arms remain in the expanded condition for providing the anchoring effect because of the arrangement of the webs supported against one another. The automatic locking effect remains even after the removal of the expansion screw or the expanding implement.

To assure an adequate anchoring effect when using such dowels, it is important that the expansion arms, the webs and the shaft portion of the dowel are coordinated with one another. As a result, only a certain dowel construction is suitable for use in a particular structural member. Therefore, when fastening a dowel in a structural member having a hollow space, the depth of the hollow space must be known and the dowel must be constructed in accordance with the thickness of the surface through which the dowel extends into the hollow space.

If the thickness of the structural member leading into the hollow space is too great, the expansion arms cannot be extended beyond the neutral mid-position and the anchoring effect is insufficient. On the other hand, if the thickness of the surface is too small or the hollow space does not provide sufficient depth, the dowel, when in the expanded position, may move in the axial direction. Accordingly, the movement of the dowel has a tendency to wear the opening through which it is inserted so that the quality of the anchoring effect is considerably deteriorated. Further, if the dowel does not extend into the hollow space in the structural member and instead is located in a borehole confined by the borehole surface, no anchoring can take place, since the expansion arms cannot be extended outwardly by the expansion screw or element.

When such a dowel is anchored in a structural member by having the webs and expansion arms extending through the neutral mid-position, a subsequent folding-up of the expansion arms to the insertion position cannot be attained. Accordingly, there is the disadvantage that the dowel cannot be removed from the structural member whether or not the expansion screw or implement is removed.

Therefore, it is the primary object of the present invention to provide an expansion dowel suitable for insertion into a structural member containing a hollow space where the surface through which the dowel is inserted can be of any thickness and wherein the dowel can be anchored even if inserted into a solid material. Furthermore, though once anchored, the expansion dowel can still be removed, if necessary.

In accordance with the present invention, with the dowel in the expanded position, each web forms an acute angle with the portion of its associated expansion arm located inwardly from the joint between the web and expansion arm. Further, as the dowel is expanded, the joints between the webs and the expansion arms move apart so that the greatest distance between them exists when the dowel is fully expanded. When the dowel is in the inserting position, the joints between the webs and the expansion arms are located close together. When the expansion arms are in the expanded position the outer ends form an angle of approximately 180°.

When the dowel embodying the present invention is in the expansion position, the expansion arms are disposed at an angle of approximately 180° to one another, that is, the radially outer ends of the arms. The webs hinged to the expansion arms form acute angles with the portions of the expansion arms located inwardly of the joints. When the dowel is arranged for insertion into a bore in a structural member, the expansion arms extend along the axis of the shaft portion of the dowel so that the expansion arms and webs are folded inwardly from the expansion position and extend along the axis of the shaft portion. In the inserting position, the ends of the webs joined to one another are located adjacent the leading end of the dowel. If the parts of the dowel are folded inwardly from the expansion position to the inserting position the junction between the ends of the webs moves axially away from the shaft portion of the dowel.

After the dowel is fully inserted into the structural member during the inserting step, the expansion arms are displaced radially outwardly due to the inherent elasticity of the plastics material used in forming the dowel. The arms reach the expanded position in accordance with the construction of the structural member into which the dowel is inserted. If the structural member is a plate or a member having a sufficiently large hollow space in its interior, and the thickness of the surface through which the dowel extends corresponds approximately to the axial length of the shaft portion, the expansion arms can be extended completely into the expansion position. If the thickness of the surface through which the dowel extends is larger than the axial length of the shaft portion, the expansion arms can extend only partly and do not reach the fully extended position. If the dowel does not extend into a hollow space, that is, if the receiving bore is solid throughout its length, the expansion arms remain in the inserting position.

In each of the above situations, an expansion screw, for example a conventional wood screw, is inserted in the dowel into a bushing attached to the interconnected ends of the webs. In the bushing, the expansion screw cuts a thread and has the effect of drawing the bushing toward the shaft portion. By continuing to thread the expansion screw into the bushing, the expansion arms and webs are displaced radially outwardly from the axis of the dowel and move toward the surface of the structural member within the hollow space until the anchoring effect is achieved. To attain the desired anchoring, it is not important whether the expansion arms extend fully outwardly or only a portion of the way into the final expansion position. A sufficient anchoring effect is gained even if the expansion arms are displaced outwardly beyond the normal expansion position, that is, in the situation where the thickness of the surface through which the dowel is inserted, is smaller than the axial length of the shaft portion. Moreover, the dowel in the present invention has the advantage that it can also be used in a solid bore, since sufficient anchoring is obtained by inserting an expansion screw and expanding the arms and webs outwardly in a manner similar to that in conventional expansion dowels formed of plastics material.

Since anchoring is achieved only by threading the expansion screw into the shaft portion and the bushing, as explained above, the dowel embodying the present invention has the further advantage that it can be removed from the structural member after the removal of the expansion screw. With the screw removed, the expansion arms can be displaced back into the inserting position if the dowel is pulled out of the structural member. To achieve a suitable support for the expansion arms in the various inserting situations which may occur, the joints between the webs and the expansion arms are preferably located at the center point of the expansion arms between the end connected to the shaft portion and the free end.

As mentioned above, a guide bushing is provided at the location where the webs are joined together and the bushing is arranged coaxial with the shaft portion. The guide bushing affords improved guidance for the expansion screw and provides a better transfer of force when the screw is engaged with the junction of the webs over an axial dimension corresponding to several turns of the threads. For improving the guidance of the expansion screw, especially in such cases where the expansion arms are not fully extended into the expansion position, stiffening ribs are provided on the surfaces of the webs which face inwardly toward the axis of the shaft portion. In the inserting position of the dowel, the combination of the webs and the reinforcing ribs form an approximately closed profile through which the expansion screw extends and prevents misalignment of the screw.

The shaft portion is extended by a sleeve-like member extending from its end facing toward the leading end of the dowel, that is, toward the location of the junction of the webs. This sleeve-like member limits the displacement of the guide bushing toward the trailing end of the dowel so that excessive expansion beyond a desired position is avoided. This feature is especially significant in cases where the thickness of the surface of the structural member or the depth of the hollow spaces is much smaller than the axial length of the shaft portion. Moreover, the sleeve-like member has the advantage that the length of the bore through which the expansion screw extends is increased.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
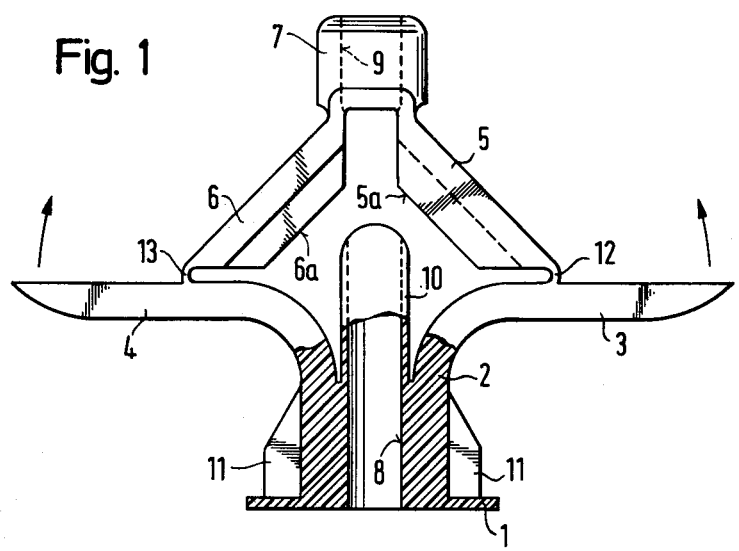
FIG. 1 is a side view, partly in section, of an expansion dowel embodying the present invention and illustrating the dowel in the expansion position.
Figure 3:
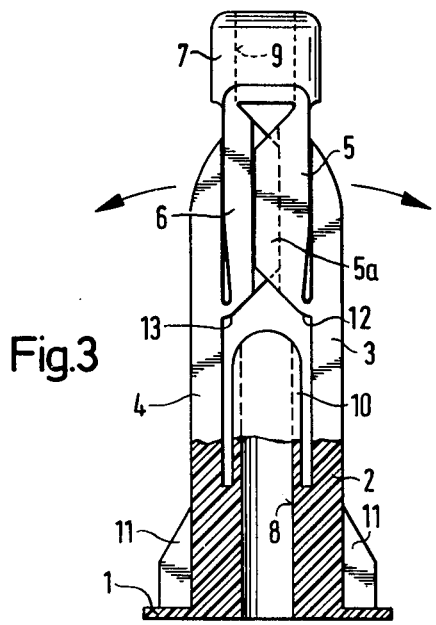
FIG. 3 is a side view of the dowel disclosed in FIG. 1, shown partly in section, and illustrating the dowel in the inserting position.

Though not shown in the drawings, the dowel is inserted through an opening in a structural member into a hollow space, accordingly, the dowel has a leading end, that is, the upper end as viewed in FIGS. 1 and 3 and a trailing end, that is, the lower end in each of these figures.

Figure 2:
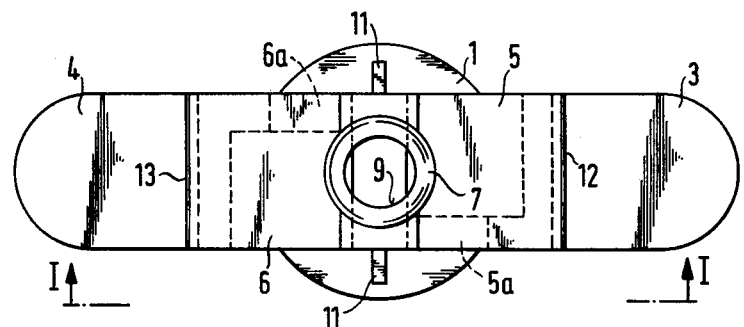
FIG. 2 is a top view of the dowel illustrated in FIG. 1.

As can be seen in FIGS. 1-3 the dowel consists of a transversely extending flange portion 1 located at its trailing end, an axially extending tubular shaft portion 2 extending from the flange at the trailing end for a portion of the axial length of the dowel, expansion arms 3 and 4 attached at one end to the shaft portion and webs 5 and 6 each connected to one of the expansion arms and interconnected to one another adjacent the leading end of the dowel. The leading end of the dowel is formed by a guide bushing 7 secured to and extending axially outwardly from the junction of the webs 5, 6. Tubular shaft portion 2 forms an axially extending bore 8 and the guide bushing coaxial with the shaft portion forms a bore 9 aligned with and spaced from the bore 8. In addition, a sleeve-like member 10 extends axially from the end of the shaft portion 2 spaced from the trailing end of the dowel. The sleeve-like member provides a continuation of the bore 8. As can be seen from the drawing, four wing-like projections 11 are formed on the outside surface of the shaft portion 2 with the projections extending in the axial direction from the flange 1 toward the other end of the shaft portion. These wing-like projections 11 prevent the dowel from rotating when it is inserted into a bore or opening. While the webs 5, 6 are interconnected at the guide bushing 7, the opposite end of each web is connected to a different one of the expansion arms 3, 4 by joints 12, 13. As can be seen in FIG. 1, the joints 12, 13 have a reduced thickness as compared to the expansion arms 3, 4. Each of the webs 5, 6 has a stiffening rib 5a, 6a with the ribs formed on the surfaces of the webs which face inwardly toward one another, that is, toward the projection of the axis of the shaft portion 2. As can be seen best in FIG. 2, the ribs 5a, 6a are located diagonally opposite one another across the projection of the axis of the sleeve portion and the guide bushing.

FIGS. 1 and 2 show the expansion dowel in the expanded position and the dowel is formed of a plastics material. The dowel assumes this expanded position after it is inserted into a structural member containing a hollow space where the depth of the material bordering the hollow space and through which the dowel passes, has a thickness equal to or smaller than the axial length of the shaft portion 2. For spreading the dowel, an expansion screw known per se and, therefore, not illustrated, is inserted through the bore 8 of the shaft portion 2 and of the sleeve-like member 10 after the dowel has been placed into the structural member. The leading end of the expansion screw protrudes from the bore 8 and enters the bore 9 of the guide bushing. As the screw is threaded into the guide bushing 7, the bushing is displaced toward the trailing end of the dowel and the webs 5 and 6 and the expansion arms 3 and 4 are displaced transversely outwardly from the axis of the shaft portion and the guide bushing. As the expansion screw continues to be threaded through the guide bushing 7, the bushing moves toward the trailing end of the dowel, that is toward the flange portion 1 located at the surface of the structural member and forces the expansion arms 3 and 4, via the webs 5 and 6, outwardly until they fit closely against the surface of the structural member within the hollow space. If the thickness of the surface through which the dowel extends into the hollow space is smaller than the axial length of the shaft portion, there is a tendency for the expansion arms to be overspread. The tendency to be overspread, in its extreme case, is prevented when the trailing end of the guide bushing 7 contacts the leading end of the sleeve-like member 10. If the depth or thickness of the surface through which the dowel passes into the hollow space is greater than the length of the shaft portion 2, the dowel can be expanded only incompletely into the expansion position shown in FIG. 1. In such a situation, the expansion arms form an angle with one another which is smaller than 180°, that is, the angle formed between the ends of the expansion arms located outwardly of the flexible joints 12, 13. The expansion screw threaded into the guide bushing 7 holds the dowel in its expansion position even if it is not fully displaced into the position shown in FIG. 1. In this arrangement, the expansion arms 3, 4 contact the surface of the structural member within the hollow space and, in combination with the flange portion 1, effect the holding action on the structural member.

In FIG. 3 the expansion dowel is illustrated in the inserting position. In this position, the expansion arms 3, 4 and the webs 5, 6 are folded or collapsed inwardly toward the leading end part of the dowel so that the arms and the webs extend in generally parallel relation with the axis of the dowel. Once inserted into the hollow space in a structural member, the action of the expansion screw threaded through the bore 8 in the shaft portion 8 and sleeve-like member 10 into the bore 9 in the guide bushing 7 causes the dowel to deform outwardly toward the position shown in FIG. 1. The extent to which the dowel reaches the expansion position shown in FIG. 1 depends on the relative dimensional features of the structural member and the dowel. If the structural member does not have an interior hollow space and the surface of the bore into which the dowel is placed is a solid surface, the dowel remains in the position shown in FIG. 3. In this position, however, the dowel can be spread by a known expansion screw so that the expansion arms and the webs are displaced outwardly into contact with the surface of the bore similar to conventional expansion dowels formed of plastics material whereby the sides of the dowel provided by the expansion arms and webs undergo a purely radial expansion. The positioning of the stiffening webs 5a, 6a diagonally opposite one another across the axis of the dowel prevents any misalignment of the expansion screw as it is inserted into the dowel, that is, the expansion arms and the webs 5, 6 along with the reinforcing ribs 5a, 6a define a passage aligned with the bore 8 in the shaft portion and the bore 9 in the guide bushing. Moreover, the arrangement of the guide bushing at the leading end of the dowel assures a proper guiding action for the expansion screw.

While specific embodiments of the invention have been shown and described in detail to illustrate the application of the inventive principles, it will be understood that the invention may be embodied otherwise without departing from such principles.

What is claimed is:

1. Expansion dowel for insertion into an opening in a receiving member, such as a plate, wall, hollow block or similar structural member having a hollow space inwardly of the surface through which the dowel is inserted, the dowel has a leading end which is inserted first through the opening so that at least a portion of the dowel extending from the leading end extends into the hollow space, and a trailing end, the dowel comprises an axially extending tubular shaft portion extending from the trailing end toward the leading end, a flange portion located at and extending transversely of and outwardly from said shaft portion at the trailing end, said shaft portion having a bore extending axially therethrough, a pair of flexible expansion arms connected to said shaft portion, a pair of webs with each said web connected to a different one of said expansion arms and said webs being interconnected, the dowel has an inserting position with the expansion arms and webs extending in the axial direction of said shaft portion and located closely together, and an expansion position with each said expansion arm and said web connected to it extending transversely outwardly from the axis of said shaft portion, wherein the improvement comprises that said expansion arms have a first end connected to said shaft portion at a location spaced from the trailing end of the dowel and a free second end spaced longitudinally from the first end in the axial direction of said shaft portion when the dowel is in the inserting position, said webs each have a first end and a second end spaced longitudinally apart with the first end flexibly connected to the associated said expansion arm and the second end connected to the second end of the other said web, in the inserting position said expansion arms and webs extend in generally paraallel relation along the axis of said shaft portion and in the expansion position said webs extend at an acute angle to the portion of the associated said expansion arm extending between the first end of said expansion arm and the junction of said web and the associated said expansion arm, the portion of said expansion arm extending from the junction with said web to the second end thereof extends approximately perpendicularly to the axis of said shaft portion, and the first end of each said web having a reduced thickness portion connected to the associated said expansion arm at a location approximately mid-way between the first and second ends of said expansion arm with the reduced thickness portion forming the flexible connection between said web and said expansion arm.

2. Expansion dowel, as set forth in claim 1, wherein a guide bushing is located at the leading end of the dowel and is attached to the second ends of said webs, said guide bushing forms a bore coaxial with the bore in said shaft portion and said guide bushing being displaceable toward said shaft portion as the dowel is deformed from the inserting position to the expansion position.

3. Expansion dowel, as set forth in claim 1, wherein each of said webs has a first surface and an oppositely facing second surface extending between the first and second ends thereof, in the inserting position the first surface faces toward the axis of said shaft portion and the second surface faces outwardly away from the axis of said shaft portion, each said web has a stiffening rib extending along the web in the direction from the first end to the second end thereof with said rib extending inwardly from the first surface toward the first surface of the opposite said web when the dowel is in the inserting position, said ribs each have a width extending transversely of the direction between the first and second ends of said web which is less than the corresponding dimension of said web, and in the inserting position said stiffening ribs are located on the opposite sides of the extension of the axis of said shaft portion.

4. Expansion dowel, as set forth in claim 1, wherein a sleeve-like part is coaxial with said shaft portion and is connected to and extends axially from the end of said shaft portion closer to the leading end of the dowel in the direction toward the leading end of the dowel, said sleeve-like part forming a bore in coaxial alignment with the bore in said shaft portion, and in the inserting position the end of said sleeve-like part closer to the leading end of the dowel is spaced from the location of the interconnection of said webs with said guide bushing.

5. Expansion dowel, as set forth in claim 4, wherein said sleeve-like part has an outside diameter less than the outside diameter of said shaft portion.

6. Expansion dowel, as set forth in claim 1, including wing-like projections formed on and projecting outwardly from the outside surface of said shaft portion, and said projections extending from said flange toward the end of said shaft portion closer to the leading end of the dowel.

* * * * *